US012711993B1

(12) United States Patent
Buchanan et al.

(10) Patent No.: US 12,711,993 B1
(45) Date of Patent: Aug. 18, 2026

(54) GENERATION OF AUDIO-VISUAL FILTERS FOR VIRTUAL SPACES

(71) Applicant: ImmerSphere, Inc., Boston, MA (US)

(72) Inventors: Lauren E. Buchanan, Quincy, MA (US); Matthew Eliot Neutra, Sherborn, MA (US); Jocelyn Scheirer, Newton, MA (US); James Ryan Mattingly Strong, Brattleboro, VT (US)

(73) Assignee: ImmerSphere, Inc., Boston, MA (US)

( * ) Notice: Subject to any disclaimer, the term of this patent is extended or adjusted under 35 U.S.C. 154(b) by 661 days.

(21) Appl. No.: 17/814,740

(22) Filed: Jul. 25, 2022

Related U.S. Application Data

(60) Provisional application No. 63/225,223, filed on Jul. 23, 2021.

(51) Int. Cl.
*G11B 27/02* (2006.01)
*G06F 3/16* (2006.01)
*G06V 10/40* (2022.01)
*G06V 20/50* (2022.01)
*G10K 15/08* (2006.01)

(52) U.S. Cl.
CPC .............. *G11B 27/02* (2013.01); *G06F 3/165* (2013.01); *G06V 10/40* (2022.01); *G06V 20/50* (2022.01); *G10K 15/08* (2013.01)

(58) Field of Classification Search
USPC .......................................................... 386/285
See application file for complete search history.

(56) References Cited

U.S. PATENT DOCUMENTS 8,831,255 B2 * 9/2014 Crawford ................ H04S 7/306 381/26
9,310,959 B2 * 4/2016 Serletic, II ............. G09B 15/04
10,288,381 B1 * 5/2019 Sirot ......................... F41G 3/26
10,402,151 B2 * 9/2019 Pance .............. H04N 21/42203
10,785,563 B1 * 9/2020 Kawata .................. H04R 3/005
10,976,543 B1 * 4/2021 Cho ........................ H04S 7/304
11,843,916 B2 * 12/2023 Wexler ..................... H04R 1/08
(Continued)

OTHER PUBLICATIONS

Yeung et al., Virtual and Augmented Reality Applications in Medicine: Analysis of the Scientific Literature, Journal of Medical Internet Research, Feb. 2001.
(Continued)

*Primary Examiner* — Nigar Chowdhury
(74) *Attorney, Agent, or Firm* — Adler Pollock & Sheehan P.C.

(57) ABSTRACT

A method for creating an audio-video performance as though performed at a given location is described. The method includes receiving location data. The location data is analyzed to identify acoustic features and visual features. An audio adjustment profile and/or a video adjustment profile is generated based on the visual features. The method also includes receiving a sound file and a video file. The audio adjustment profile is applied to the sound file to create a sound performance and the video adjustment profile is applied to the video file to create a video performance. The sound performance and the video performance are combined to create an audio-video performance so that it appears as though the performance were performed at the location. The method includes playing the audio-video performance.

19 Claims, 13 Drawing Sheets

(56) References Cited

U.S. PATENT DOCUMENTS

| | | | | |
|---|---|---|---|---|
| 2009/0114079 | A1* | 5/2009 | Egan | G09B 15/023 84/477 R |
| 2012/0096810 | A1* | 4/2012 | Heisel | B65B 11/02 53/429 |
| 2013/0106689 | A1* | 5/2013 | Salsman | G10H 1/0008 345/156 |
| 2013/0162749 | A1* | 6/2013 | Eskilsson | H04N 7/144 348/14.1 |
| 2015/0304724 | A1* | 10/2015 | Prosserman | H04N 21/44008 725/37 |
| 2018/0024630 | A1* | 1/2018 | Goossens | G06F 3/011 345/156 |
| 2018/0132309 | A1* | 5/2018 | Chen | H04W 84/20 |
| 2018/0139565 | A1* | 5/2018 | Norris | H04S 1/007 |
| 2018/0193675 | A1* | 7/2018 | Vortman | A61B 5/055 |
| 2018/0227694 | A1* | 8/2018 | King | H04S 7/302 |
| 2018/0288558 | A1* | 10/2018 | Umminger, III | H04S 7/303 |
| 2018/0324539 | A1* | 11/2018 | Lovitt | G06T 19/006 |
| 2019/0128676 | A1* | 5/2019 | Naik | G01C 21/206 |
| 2019/0200158 | A1* | 6/2019 | Verbeke | G06F 1/163 |
| 2019/0282204 | A1* | 9/2019 | Sudol | A61B 8/12 |
| 2019/0320114 | A1* | 10/2019 | Lee | H04N 5/60 |
| 2019/0342647 | A1* | 11/2019 | Mehra | H04R 17/00 |
| 2019/0373395 | A1* | 12/2019 | Sarkar | H04S 7/304 |
| 2019/0378385 | A1* | 12/2019 | Biggs | H04R 1/1091 |
| 2019/0379861 | A1* | 12/2019 | Clark | G06T 7/593 |
| 2020/0042284 | A1* | 2/2020 | Milne | G06F 3/04883 |
| 2020/0110520 | A1* | 4/2020 | Barlow | G06N 20/00 |
| 2020/0142667 | A1* | 5/2020 | Querze | G06F 3/165 |
| 2020/0364187 | A1* | 11/2020 | Tran | G06N 3/02 |
| 2020/0402490 | A1* | 12/2020 | Duthaler | H04R 1/406 |
| 2021/0160617 | A1* | 5/2021 | Neerbek | H04S 7/305 |
| 2021/0308413 | A1* | 10/2021 | Pierne | A61M 21/02 |
| 2021/0344991 | A1* | 11/2021 | Todd | H04N 21/4438 |
| 2021/0390729 | A1* | 12/2021 | Fox-Roberts | G06T 7/73 |

OTHER PUBLICATIONS

Hughes et al., The Psychometrics of Cybersickness in Augmented Reality, Frontiers in Virtual Reality, Dec. 9, 2020.

Honzel et al., Virtual Reality, Music, and Pain: Developing the Premise for an Interdisciplinary Approach to Pain Management, HHS Public Access, Pain, Sep. 2019.

Malloy et al., The Effectiveness of Virtual Reality Distraction for Pain Reduction: A Systematic Review, Science Direct, Clinical Psychology Review 30, 2010.

Howlin et al., Cognitive Agency in Music Interventions: Increased Perceived Control of Music Predicts Increased Pain Tolerance, European Journal of Pain, 2021.

* cited by examiner

GENERATION OF AUDIO-VISUAL FILTERS FOR VIRTUAL SPACES

CROSS REFERENCE TO RELATED APPLICATION

This patent application claims priority from U.S. Provisional Patent Application No. 63/225,223, filed Jul. 23, 2021, the disclosure of which is incorporated by reference herein in its entirety.

BACKGROUND

Various embodiments relate generally to sound filter generation systems, methods, devices and computer programs and, more specifically, relate to classification of 360-Degree images of spaces for automatic generation of sound reverberation or sound filter.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Computer systems can be used to combine images, such as to place a picture of a person in a location where they were not. Video and audio files can also be combined in a similar manner but such combinations a problematic due to difference between the files. For example, a video of someone in one location may be incorrectly lit for the resulting image, either too bright, too dark or at the wrong angle. Likewise, audio files may not properly reflect the sound quality of the location.

What is needed is a process to generate audio-visual filter based on an image file of a location so as to adjust an audio-visual file to sound (and appear) as though it was created at the location.

SUMMARY

The below summary is merely representative and non-limiting.

The above problems are overcome, and other advantages may be realized, by the use of the embodiments.

In a first aspect, an embodiment provides a method for creating an audio-video performance as though performed at a given location. The method includes receiving image data of a location. The method then analyzes the image data to identify acoustic features and analyzing the image data to identify visual features. An audio adjustment profile is generated based on the acoustic features and a video adjustment profile is generated based on the visual features. The method also includes receiving a sound file and receiving a video file. The audio adjustment profile is applied to the sound file to create a sound performance. The audio from the sound performance is adjusted to sound as though performed at the location. The video adjustment profile is applied to the video file to create a video performance so that video from the video performance appears as though performed at the location. The sound performance and the video performance are combined to create an audio-video performance. The method includes playing the audio-video performance.

In another aspect, an embodiment provides a computer readable medium tangibly encoded with a computer program executable by a processor to perform the method above.

In a further aspect, an embodiment provides an apparatus, having one or more processors; and one or more memories including computer program code, the memories and the computer program code configured to, with the processors, cause the apparatus to perform the method above.

BRIEF DESCRIPTION OF THE DRAWINGS

Aspects of the described embodiments are more evident in the following description, when read in conjunction with the attached Figures.

DETAILED DESCRIPTION

Figure 1:
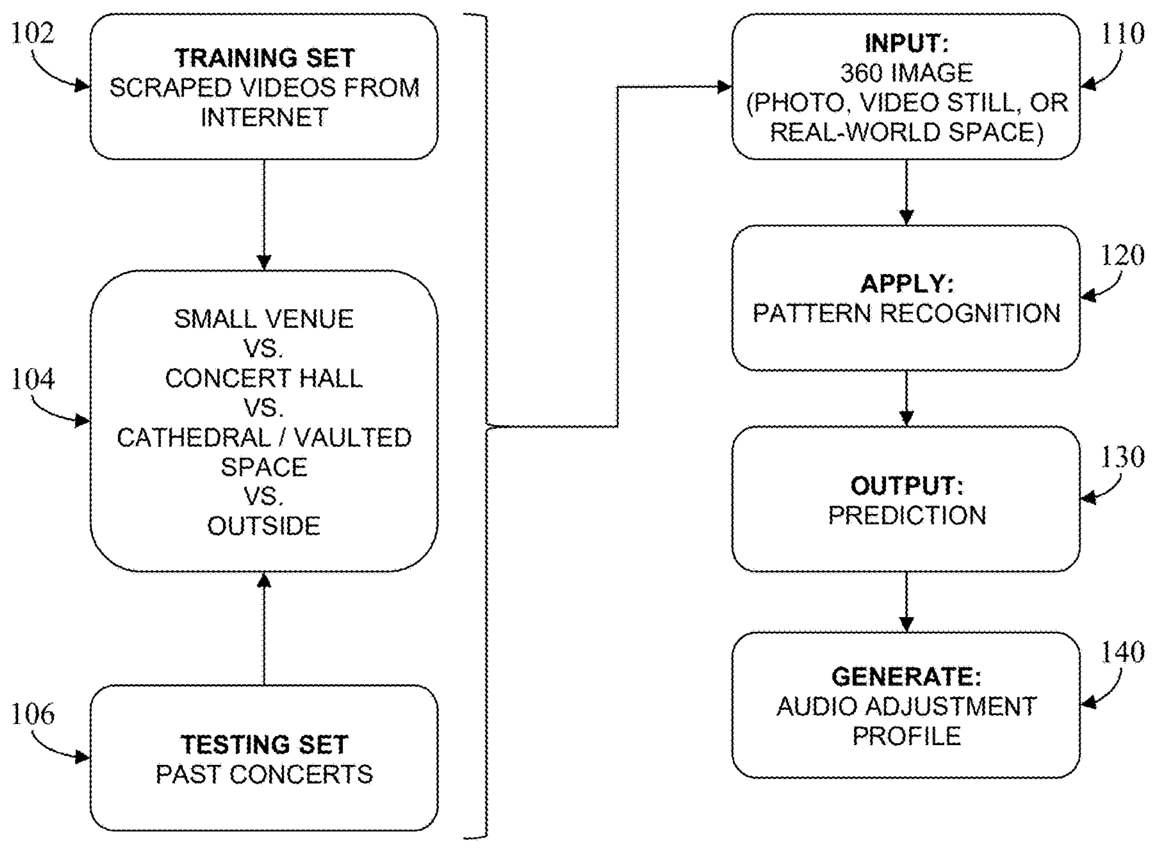
FIG. 1 illustrates a flow diagram of a process to classify a 360-degree image for generation of an audio filter.

FIG. 1 illustrates a flow diagram of a process to classify a 360-degree image for generation of an audio filter. In the diagram above, the performance spaces may be classified "small venue" vs. "concert hall" vs. "cathedral/vaulted space" vs. "outside," however, a variety of other designations or groupings of performance environments may also be used.

In one, non-limiting exemplary protocol, there are three elements which are combined to create a variety of novel combinations of visual and acoustic experiences. These three key elements are: a digitally-captured performer, a digitally-captured performance setting, and a digitally-captured representation of the real world as seen by the user through a camera.

Creators using the method are able to submit media elements representing performers and media elements representing performance locations or spaces. These elements can be combined with real world environments which have been captured with various cameras and sensors.

The elements representing the performers can be videos or volumetric videos that capture the entire body of the performer. Performer elements can then be digitally processed to remove all background components, leaving only pixels or voxels that represent the performer. The removal of background elements enables the insertion of those performers into real or generated digital space. In some implementations, the performer can be filmed in front of a greenscreen or other uniformly colored surface to aid in the background removal process. In some implementations the background will be removed using artificial intelligence (AI) or machine learning. In some implementations the background can be differentiated from the performer using lidar and depth mapping techniques.

The elements that represent the performance locations or spaces can be captured using a 360-degree photograph or 360-degree video of any actual or imagined place. Performance spaces can also be captured using photogrammetric techniques, lidar techniques, and other methods used to capture and describe physical spaces. Embodiments of the audio classification protocol can automatically discern the amount of "inside/outsideness," "vastness," "reflectiveness," "absorbness," and other acoustic attributes of the 360-degree captured space and apply appropriate acoustic adjustments or audio filters to adjust the performance sound appropriately to match the 360-degree space in which it is experienced by the user.

In the case of non-acoustic spaces such as underwater or in outer space, one embodiment, called the ImmerSphere system, can discern such conditions (such as "underwaterness" or "outer-spaceness") and apply sound filters to adjust the performance sound, such as warbliness, tonal distortion, delay, echoic overlay, and more, each filter available in adjustable degree of intensity.

In addition, users will be able to upload their custom-designed sound filters to accompany a 360-degree place, or they may select acoustic attributes to create their own sound filters to apply to a 360-degree place.

For users who wish to incorporate an exact acoustic replication of a space, the interface can enable the user to upload a recorded impulse response of a specific space, and the audio classification protocol can use that precise impulse response instead of a synthetic one, incorporating it into an algorithm associated uniquely with the specific 360-degree place.

In other embodiments, the audio classification protocol can incorporate three-dimensional volumetric video as the audiovisual performance, such as generated by some multi-camera and video synthesis systems. In other embodiments, the audio classification protocol also includes incorporating AI-based greenscreen technology in which a physical greenscreen is not necessary in the performance capture to create a hologram.

FIG. 1 illustrates an image classifier process with a few categories of reverb filter presets: small, medium, and large indoor spaces, plus outdoor spaces. Various embodiments may use a computer vision (CV) algorithm to analyze a received image 110 using pattern recognition 120, return a 'prediction' about its acoustic (or non-acoustic) attributes 130, generate an audio adjustment profile, which will enable application of a reverb preset or sound filter 140 in the app when using that image.

A variety of sets, such as scraped videos 102 and past concerts 106, may be classified 104 and used as input in order to train the pattern recognition. The algorithm may be adjusted to better suit the results in the training sets 102, 106 and better match the actual conditions.

Example acoustic attributes that make up the prediction include "Outsideness," "Vastness," "Scatterness," and "Absorbness." These are each given values between 0 and 1, calculated using results from the computer vision analysis. Different CV analysis techniques can be employed, including scene identification, semantic segmentation, or object identification. Before calculating the prediction, various possible results of CV analysis are assigned values 0-1 for each attribute, such that the result-values can be averaged into prediction-values. If the image is recognized by the audio classification protocol as an acoustic space, the preset is a synthetic impulse response approximating the acoustic properties of the space. If the image is recognized as a non-acoustic space, the preset is a sound filter applied to the specific type of space (a warbly filter for 360s recognized as being "underwater," etc.). In some embodiments, a computer vision service, such as 'Rekognition', may be used to achieve at least a portion of the "image→prediction→audio preset" flow.

Describing the diagrammed flow in detail, the input is a 360-degree photo, one frame of a 360-degree video, or a 360-degree space as recognized by the user's camera (this "real world" input scenario is described separately below). The output is an audio filter, particularly a reverb filter, but could also be a sound filter. Some embodiments may use "Presets," meaning each input gets assigned one of a small number of pre-programmed results. In other embodiments, the number of presets may be increased by separating the semantic labels into smaller more specific categories. In the pattern recognition portion of the flow, each photo is analyzed, and the results parsed to determine which preset to use. The photo analysis returns a set of semantic labels, e.g., "Church," "Building," "Flooring," and confidence values for each label. The process collects these labels to assign a prediction on the picture. It assigns each label to a preset category, adding up the confidence values from all of the labels for each category, and assigning the preset for whichever category gets the highest total confidence. In one, non-limiting embodiment, it can be Indoors, Outdoors, Underwater, or Outer Space.

Other candidates for pattern recognition include other computer vision algorithms: such as using semantic segmentation in much finer granularity, scene detection instead of semantic labeling, object detection with bounding boxes, and/or edge detection. The technique is to use a CV algorithm and parse the results of that algorithm into a reverb filter programmatically. Beyond CV, it is also possible to apply user-selected labels, mechanical turk classifications, and other human perceptions of a space.

Some of the various methods and techniques to parse the 360 images include:

- icosahedral tangent slices technique—To mitigate spherical distortion, the image is cut into an arbitrary number of icosahedral tangent images, which changes the input to the black box; any number of results may also be collected from the CV algorithm of choice per image.
- Rectangular sections—when using spherical images, icosahedral tangents make special sense, but it is also possible to use rectangular sections.
- Separate the whole image (or an arbitrary subset of tangents) into different layers, e.g., contrast layer, edge detection layer, color grade layers (like RGB), and send those to the CV algorithm.
- Use multiple separate CV analyses and parse across them.
- Instead of computer vision, use a human to categorize images.
- Parse by average color or brightness (e.g., outdoor spaces may be brighter).
- Look for softer edges in an edge detection algorithm, and assume those are outdoor spaces.

Figure 2:
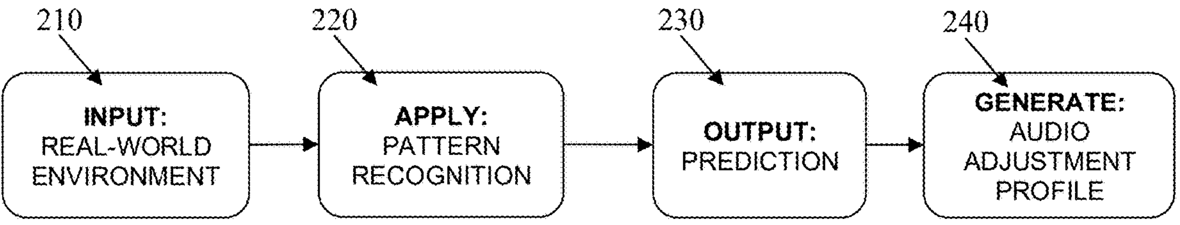
FIG. 2 illustrates another flow diagram of a process to classify a 360-degree image for generation of an audio filter.

FIG. 2 illustrates another flow diagram of a process to classify a 360-degree image for generation of an audio filter. As shown the process includes receiving real-world environment as input 210, as seen through hardware such as a smartphone camera lens, AR glasses, or other image capture device. This differs from the above-described flow in that the input is the actual world and not an artifact such as a photo or photo still from a video. The process applies pattern recognition 220 to the input and creates a prediction as output 230. The prediction can then be used to generate an audio filter 240 which is applied to sound data. In addition to the above-mentioned computer vision object identification algorithms running in real time, the real-world flow can implement additional pattern recognition techniques, including several features of Niantic's Lightship augmented reality development kit (ARDK). These pattern recognition techniques include semantic segmentation, as well as a visual positioning system (VPS) which provides geometric scanning of the real-world environment around the user.

The audio classification protocol can input these pattern recognition methods into its flow to create the prediction, generate the audio adjustment profile, and apply the appropriate audio filter to the performance video that appears as a hologram in the user's real-world space. Further embodiments of the audio classification protocol include incorporating pattern recognition from multiple synchronized user devices in multiplayer scenarios and using real-time computer vision analysis to generate an appropriate acoustic prediction for the users' real-world environment and apply a reverb filter to match. Other applications could include incorporating real-time impulse response data into the audio classification protocol.

After parsing the 360° image or real-world space, each resulting prediction can be further examined. This examination may load an arbitrary number of impulse responses (IRs) into memory, for a set of possible materials that may be present in the image(s). These include sand, brick, stone, generic reflective material, generic diffuse material, and generic absorbent material. The IRs are written to disk as JSON files consisting of one array of floats. Like a wav file, but smaller and specific for this use case.

Next it loads a file which represents a list of predictions. For each prediction, it checks the effect enumerator and skips all those predictions with anything that isn't reverb. It can then synthesize an impulse response (IR) with a decay time calculated from the vastness, outdoorsness, and absorbness variables using the following equation:

Decay Time=2*vastness−1.5*outdoorsness−0.75*absorbness+0.75

The decay time will increase to 0.01 if the equation would drop it below 0. Given a decay time in seconds, it generates an array of pink noise, and applies an exponential decay envelope and a logarithmic attack envelope. Finally, it applies a low-pass filter to the pink noise based on the vastness and absorbness variables using:

$$\text{Cutoff Frequency}=16000-100^{(1+0.5*vastness+0.5*absorbness)}$$

This equation may instead be replaced with acoustic modeling of high frequency loss over distance, as well as model surfaces absorbing high frequency content. The IR can then be normalized and written to JSON.

Next, additional reverb variables are determined, the loudness of the reverb and the delay of the reverb. This reflects how long does it take for late reflections to reach the listener, and how loud are they when they do.

Late Reflections Gain =−6−(40*outdoorsness+10*vastness+10*absorbness)

Late Reflections Delay=10+90*vastness

Gain is expressed in decibels, and delay in milliseconds. This gives vastness a practical limit of a space about 100 feet across if the performer and listener are near the center of the space and late reflections are taking 100 ms to reach the listener.

Finally the list of predicted reflections are reviewed. Each one is assigned a mix level, delay, lowpass frequency, and impulse response.

Mix Level=1/(2*$\log_2$ distance), this is a linear mix value between 0 and 1, such that 0.5 is equivalent to −3 dB, 0.25 is −6 dB, etc. Every doubling of distance is a parabolically decreasing −dB in this equation as written, which is strictly incorrect from a physics standpoint. (The first doubling is −3, and it gets smaller from there. It should be −6 dB per doubling in the free field, e.g., an entirely outdoor space, and slightly smaller than −6 in a reverberant field depending on the size of a room. Thus, this equation could be changed slightly depending on outdoorsness.)

If the CV algorithm has identified an indoor space, or any two opposing walls that create a resonant body of air, the audio classification protocol can simulate modal resonance based on these values as well. A bandpass filter may be applied. This filter may have a resonant frequency calculated based on the size of the space, e.g., 'vastness;' or for an entirely enclosed space, multiple bandpass filters may be applied for several of the lowest order room modes.

Delay=Distance*1.75, limited between 1 and 1000. Also due for an update to accurately model the speed of sound.

Lowpass=16000−distance$^{1.5}$, limited between 2000 and 16000

The predicted material is simply passed as a name, trusting the app will find the IR by filename when the time comes.

The algorithm then packages everything in a JSON sphereData object for the ImmerSphere app to render.

To summarize, there are four output options for the audio filter:

1. Reverb effects/reverb filter
   a. The reverb filter is an approximation of what a space would sound like, using a synthetic IR created by the audio classification protocol.
   b. The output is convolution reverb settings, meaning an impulse response which can be used in convolution: loudness, timing, and frequency cutoff values that can help simulate acoustics.
2. Sound filters, including custom-designed sound filters, for non-acoustic or invented spaces
   a. This may include a number of sound filters to manipulate sound presented in non-acoustic 360-degree spaces.
   b. Users (creators) can upload their own custom-designed sound filters.
   c. In the case of invented spaces, specific audio filters can be associated to specific 360-degree spaces for the audio experience of that particular space.
3. Exact acoustic replication of a space applied to performance files a. In this scenario, the user can upload a recorded impulse response of a specific space. The system uses the precise IR in its algorithms.
4. A dashboard of metadata options enables users to custom-create a sound filter by category.
   a. Users select checkboxes from a list of attributes which they can upload as metadata associated with a particular 360-degree space. The audio classification protocol applies them as semantic labels to the same interpreter. The metadata are reinterpreted on download as the audio filter.

The steps and components used to build this Al include:

1. A training set of performance space images/videos, including video files, photographs and drawings, scraped from available 360-degree photos and videos on the internet. This includes venues ranging from small intimate places to large concert halls to large outdoor plazas and nature settings.
2. A testing set of concerts and performances, made up of past concerts and/or performance audio and images taken from the web.
3. Algorithm for classifying the performance photos/videos with associated audio tracks.
4. Iterative testing.

After a training set of 360-degree photos with varied venues has been assembled, the algorithm can be subjected to image processing for classification purposes, which could include any or all of the following:

Sharpening filter

Edge detection

Image gradient detector

"Harris Detector"—this is a "key point detector" which detects edges, corners, flat regions Image Segmentation—this is the process of dividing an image into different regions based on the characteristics of pixels to identify objects or boundaries to simplify an image and more efficiently analyze it Clustering-pixels that share certain features such as color, intensity or texture are grouped together and represented as a single entity All or a subset of these 360-degree photos and associated image-processed classifications used together can be used to help build the classifier that uses Image Recognition through an algorithm to determine a prediction. This prediction can provide a value-such as the amount of "outsideness," for example, which can be applied to selectively modify an audio or visual effect. Various values are contemplated, including:

"outsideness"—which can be used to adjust a level of reverberation in the audio track;

"closeness"—which can be used to adjust treble or volume in the audio track;

"underwaterness"—which can be used to adjust warble in the audio track

"space"—which detects the amount of circular or sphere-like objects and predicts the likelihood of being a photo of space, which can be used to adjust tonal quality "People"—which can be used to adjust a chorus effect "POV" which can be used to adjust all the variables from a different camera viewpoint (outsideness, closeness, underwaterness, space, people)·

"Plushness"—determining the amount of sound-absorbing textiles in a space which adjusts the muffling and quick decay of the sound (strong attenuation of high frequencies)·

"Hardness"—determining the hard surfaces in a space, which adjusts increased loudness and extensive reverberation/echo "Vastness"-determining the vastness of the space, adjusting the delay/echo between the visible act of the sound being made and the sound reaching the listener The AI-generated audio produced by treating audio from performance videos with the output of the audio classification protocol can be experienced in several ways by the user, each of which is also dependent on the user's hardware. Some hardwares which enable an audio experience include but are not limited to:

smartphone speaker sound stereo sound head tracking (if wearing AR glasses, VR headsets, or earbuds with head tracking)

viewer tracking if using smartphone camera immersive audio

Ambient sound: Users have the opportunity to upload ambient sound files, such as mp3s, and associate them with a 360-degree photo, or to upload a 360-degree video including ambient sound. The two audio tracks of the ambient sound recording, and the performance recording can be overlaid in different degrees of sonic opacity/transparency.

Degrees of freedom as they apply acoustically: Depending on which augmented reality (AR) building block the user is encountering, be it a Sphere (defined here as the term used to indicate the combination of a performance video placed inside a 360-degree location image or video) or a hologram asset placed in a real-world environment, the resulting degrees of freedom also impact the audio experience. Sound is experienced as emanating from the fixed place of the performer. In a 3-degrees of freedom scenario within a Sphere, audio experiences like headtracking would apply. In a 6-degrees of freedom scenario, with a performance hologram placed in a real-world environment as detected by the user's camera, the audio experience would change as the user moved about in real space, for instance approaching the performer hologram to increase the volume and audio detail of the experience or standing behind a real-world object to muffle or deflect the audio experience.

As discussed above, "Sphere" is used to refer to a combination of a performance video placed inside a 360-degree location image or video. The use of an acoustic adjustment profile (or audio filter) and a video adjustment profile (or video filter) ensures the performance appears and sounds as though it were originally performed in the 360-degree location.

In further applications of the audio classification system, the VPS may be integrated into the flow, and the acoustic experience in 3D spaces can include occlusion, reflection, absorption, and more from actual objects and surfaces in the environment. Other options include using 3D holograms in addition to 2.5D holograms and enabling 6-degrees of freedom within the Sphere itself.

The following are visual adjustments to integrate the performance hologram into the 360-degree environment. These visual adjustments may be stored together as a visual adjustment profile which can be applied to any performance hologram so that when the performance is displayed within the 3D space the resulting combination appears visually consistent (e.g., similar lighting, shadow, etc.).

Since the performance video includes not just audio but the visual of the performers, a CV algorithm may be used to detect an appropriate flat surface within the 360-degree environment that could be used as the "stage" on which the hologram would appear, using edge detection, and/or object detection to find an "empty" e.g. unlabeled region in the image.

The CV can also use object detection to recognize the size of the performance hologram, and be able to adjust the scale of the hologram to place it proportionally on the "stage," sized appropriately in relation to other objects detected in the 360.

The CV would also create shader presets upon the input of the 360-degree image, recognizing the lighting and shadowing adjustments required to blend together naturally the two assets of performance video and 360-degree environment. To achieve this, upon input of the 360 image, the CV would do image processing including:

- detecting the light source of the 360 image and thus the direction the hologram shadows would be cast within the image
- detecting the granularity of light/dark in the 360 image and thus the opaqueness of the hologram shadows
- detecting any objects in the image over which the hologram shadows would be modified by changing angles of surfaces or objects in their path
- detecting any differences in lighting on the identified "stage" (such as spotlight) or cusps/penumbras where a hologram's lighting would change To keep the computational load light, these prediction outputs would be hardcoded values that would be part of the visual metadata of the 360 images.

In summary, visual adjustments include:

- "Plane-ness"-which can be used along with other delimiters ("horizontalness," "centeredness," "surface area," "foregroundness") to identify an appropriate "stage" inside the 360 photo on which the hologram can be placed.
- "Scale"—to adjust the size of the hologram of performers to be in proportion to whatever referential objects inhabit the 360 photo
- "Light intensity on detected stage"—to enable holograms to be lit appropriately in relation to the identified stage within the 360 (often spotlighted)·
- "Source of light"—To determine the location, color, intensity, "collimatedness" of a source of light of a 360 photo to automate how a hologram within the photo would cast a shadow.

Both the audio and visual pattern recognitions can also be used to create mood alteration and/or desired emotional response algorithms for users. These algorithms can also be utilized in pain mediation, as one example application. Emotional algorithms or altered moods could be created from factors such as:

- "Outsideness/insideness"—used along with Eigenvectors/arrangements of people to determine things like:
- "serenity" level of user=certain kinds of outsideness/no people
- "awe/majestic" response of user=certain kinds of outsideness/no people
- "inclusiveness/feelings of belonging"=insideness/presence of people, amplified by the frisson of the Sphere enveloping the user The familiarity of a 360-degree space as well as the ambient sounds of that space also generate emotional responses which can be harnessed through metadata and search functions. Familiarity in the real world with both the visual and acoustic space of the AR sphere provokes an intense emotional response: elation, joy, nostalgia, feelings of being reunited, crying, relief, catharsis/release of trauma.

- Emotional responses intensify as users are able to access more interactive possibilities. For example, multiplayer interaction possibilities can create the exhilaration of the extension of human abilities and senses; the euphoric feelings accompanying the ability to meet with beloved others unrestrained by time and space limitations; the divine feeling of transcending earthly laws altogether.

Biometric sensors may be integrated in the system. These biometric sensors can be used to guide mood adjustments based on actual biometric data and the user's subjective feedback of mood.

TABLE 1

Moods classified according to musical components.
Source: Derived from Bhar (2014).
(See "Music Mood Classification" by Michael Nuzzolo)

| Mood | Intensity | Timbre | Pitch | Rhythm |
|---|---|---|---|---|
| Happy | Medium | Medium | Very High | Very High |
| Exuberant | High | Medium | High | High |
| Energetic | Very High | Medium | Medium | High |
| Frantic | High | Very High | Low | Very High |
| Anxious/Sad | Medium | Very Low | Very Low | Low |
| Depression | Low | Low | Low | Low |
| Calm | Very Low | Very Low | Medium | Very Low |
| Contentment | Low | Low | High | Low |

Table 1 shows all eight of Thayer's mood classifications with the relative degree of different musical components found in each-from very low to very high. Higher energy moods such as happy, exuberant, and energetic all have generally higher amounts of intensity, timbre, pitch, and rhythm than lower energy moods such as calm, contentment, and depressed.

Using the mood classifications, audio files may be selected in order to create a specific emotional response in a user. Likewise, locations may be assigned mood classification. Combining both audio and location files may help create the desired atmosphere for an emotional response.

Another related choice offered to the user is what performance they want to experience in the selected space. They could select the 360-degree environment and the performer video and combine them together, with the AI-generated audio-visual blending of the two assets for an immersive experience.

- The affordance of choice in choosing the destination and possibly the performance to be experienced within creates positive emotions such as calmness, confidence, autonomy, achievement, and a sense of having control.

Various embodiments can be used to create a frictionless end-to-end workflow for users at both the prosumer and consumer levels to capture, edit, and upload assets, arrange assets in a delivery format, and enable rendering of content to users.

Terminology

The workflow enables the user to capture the three building blocks of the experience, those three building blocks being:

1. Performance video ("performance asset" below)
2. 360-degree environment ("environment asset" below)
3. Real-world environment The term "Sphere" is another building block term indicating the combination of a performance video and a 360-degree environment.

Figures 3, 4:
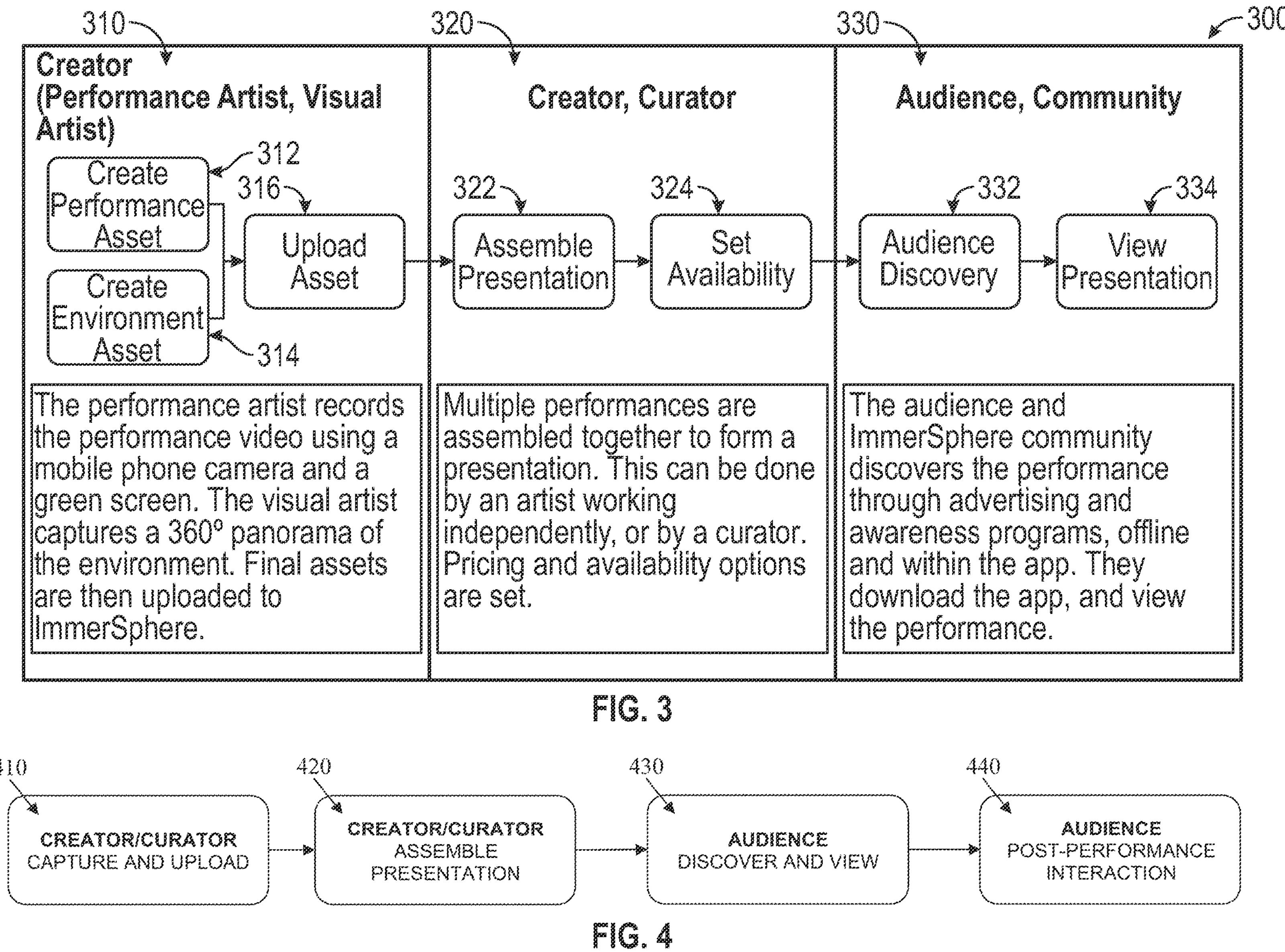
FIG. 3 demonstrates a high-level end-to-end workflow diagram.
FIG. 4 demonstrates another high-level end-to-end workflow.

FIG. 3 demonstrates a high-level end-to-end workflow diagram, illustrating the three workflow stages of Capture→Deliver→Render. As shown, the workflow is divided into three sections the creator section 310, which includes performance artists and visual artists, the creator/curator section 320 and the audience/community section 330. The proposed workflow covers three classes of activity that is directly tied to hardware at each of these three stages.

In the creator section 310 (corresponding to the "Capture" workflow stage), the creator can make a performance asset 312, such as an audio and/or video recording. These assets can then be uploaded 316. As one non-limiting example, the performance artist records the performance video using a mobile phone camera and a green screen. The visual artist captures a 360° panorama of the environment. Final assets are then uploaded.

In the creator/curator section 320, multiple performances are assembled together 322 to form a presentation. This can be done by an artist working independently, or by a curator. Pricing and availability options are set 324.

The audience and ImmerSphere community discover the performance 332 through advertising and awareness programs, offline and within the app. They download the app, and view the performance 334.

FIG. 4 demonstrates a detailed end-to-end workflow. In the embodiment, the workflow is divided into four sections: the creator section 410, where assets are captured and uploaded, the creator/curator section 420, where presentations are assembled, a first audience section 430, where the presentations are discovered and viewed and a second audience section 440, where they can provide post-performance interaction. These sections are described further in FIG. 5 (creator section 410); FIG. 6 (creator/curator section 420) and FIG. 7 (the first audience section 430 and the second audience section 440).

CAPTURE FLOW—This is the Create stage in which the user captures a performer/performance. The creator can capture a video in standard formats using any camera device, where the camera is pointing at the performer and the performer is framed against a plane surface of uniform color. That color can be a green screen, a blue screen or a surface of any uniform color. The background could also be any background using AI to remove the background to create the hologram.

Figure 5:
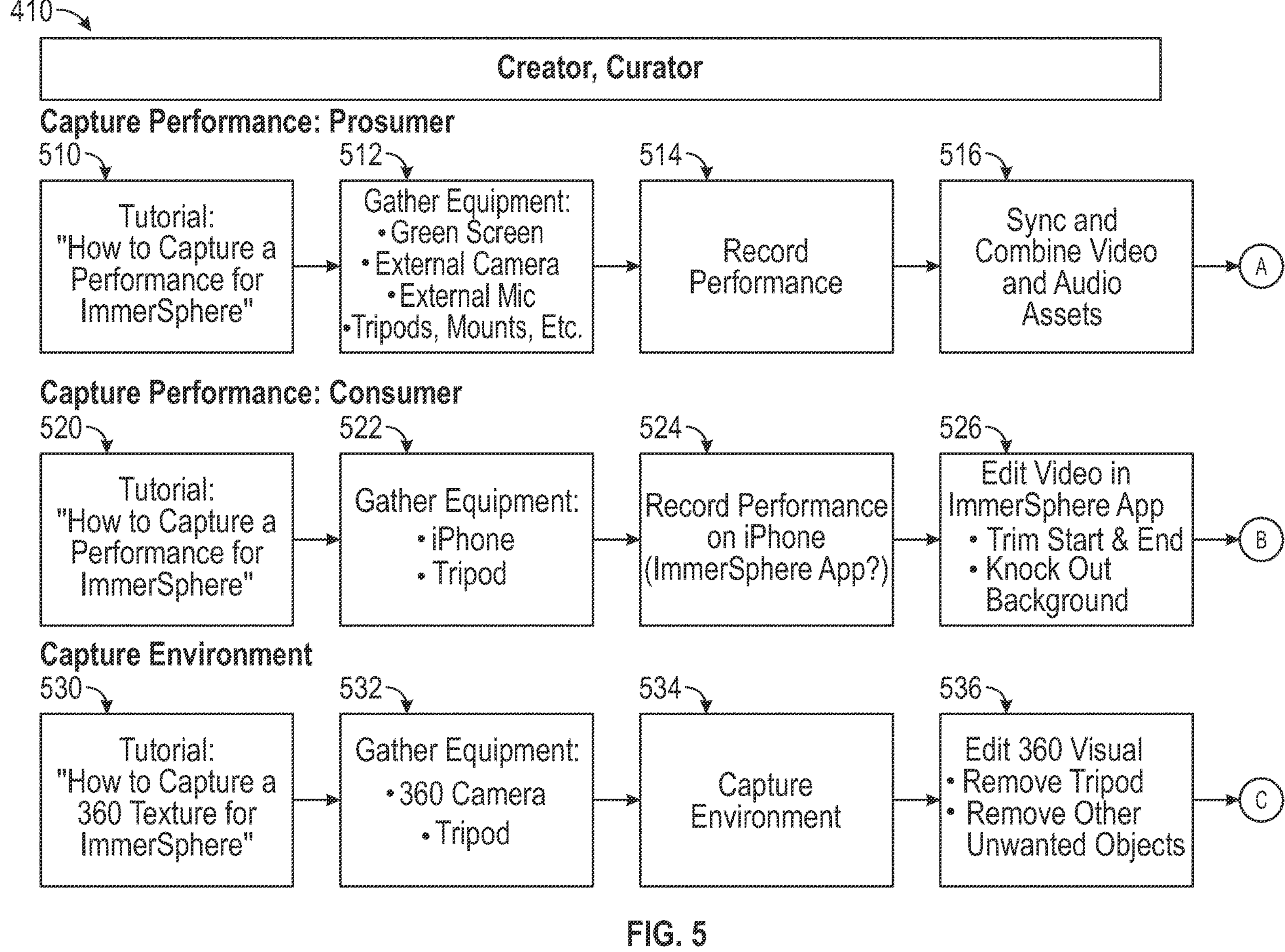
FIG. 5 illustrates the capture and upload portion of the workflow in FIG. 4.
Figure 5:
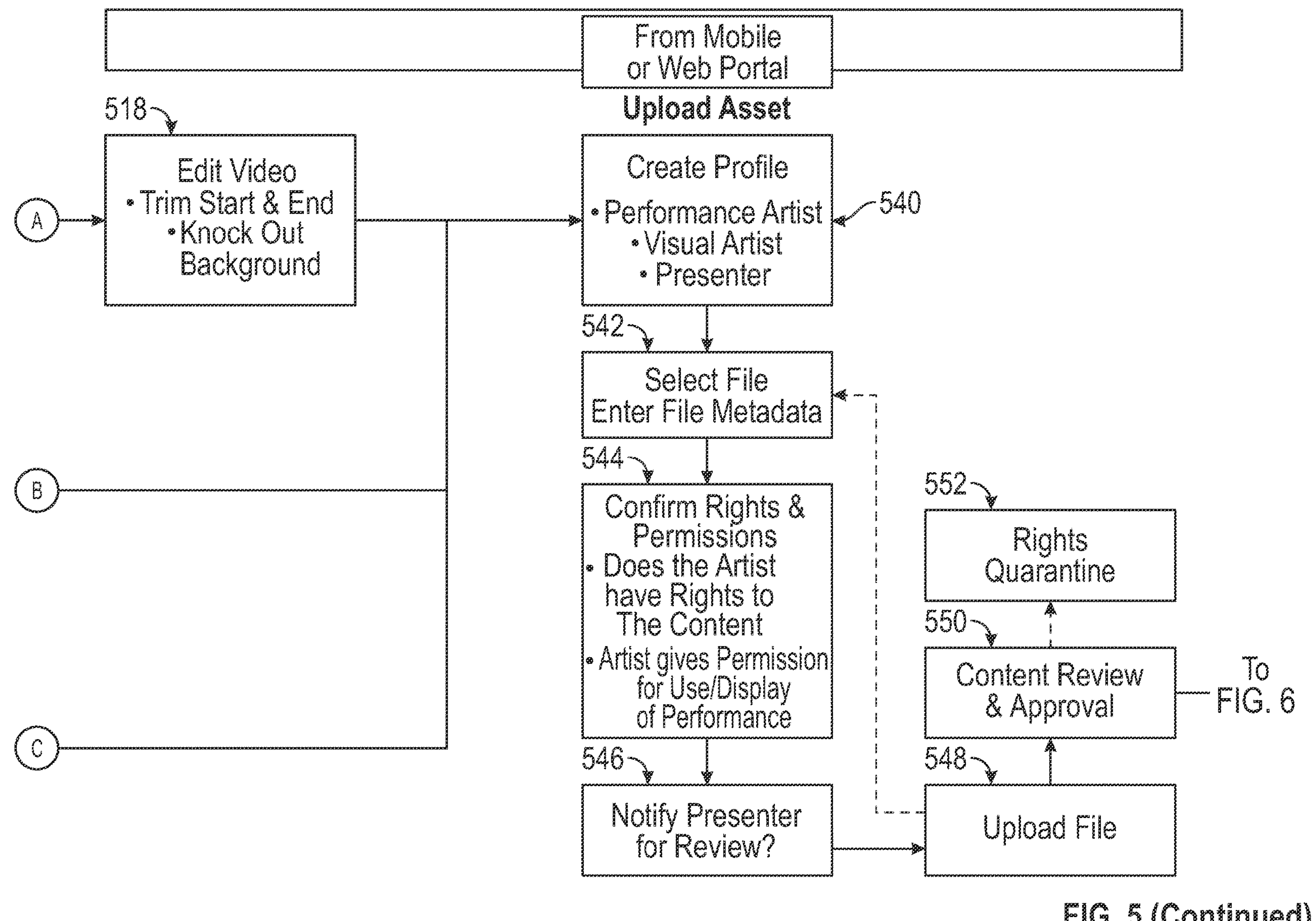
Figure 6:
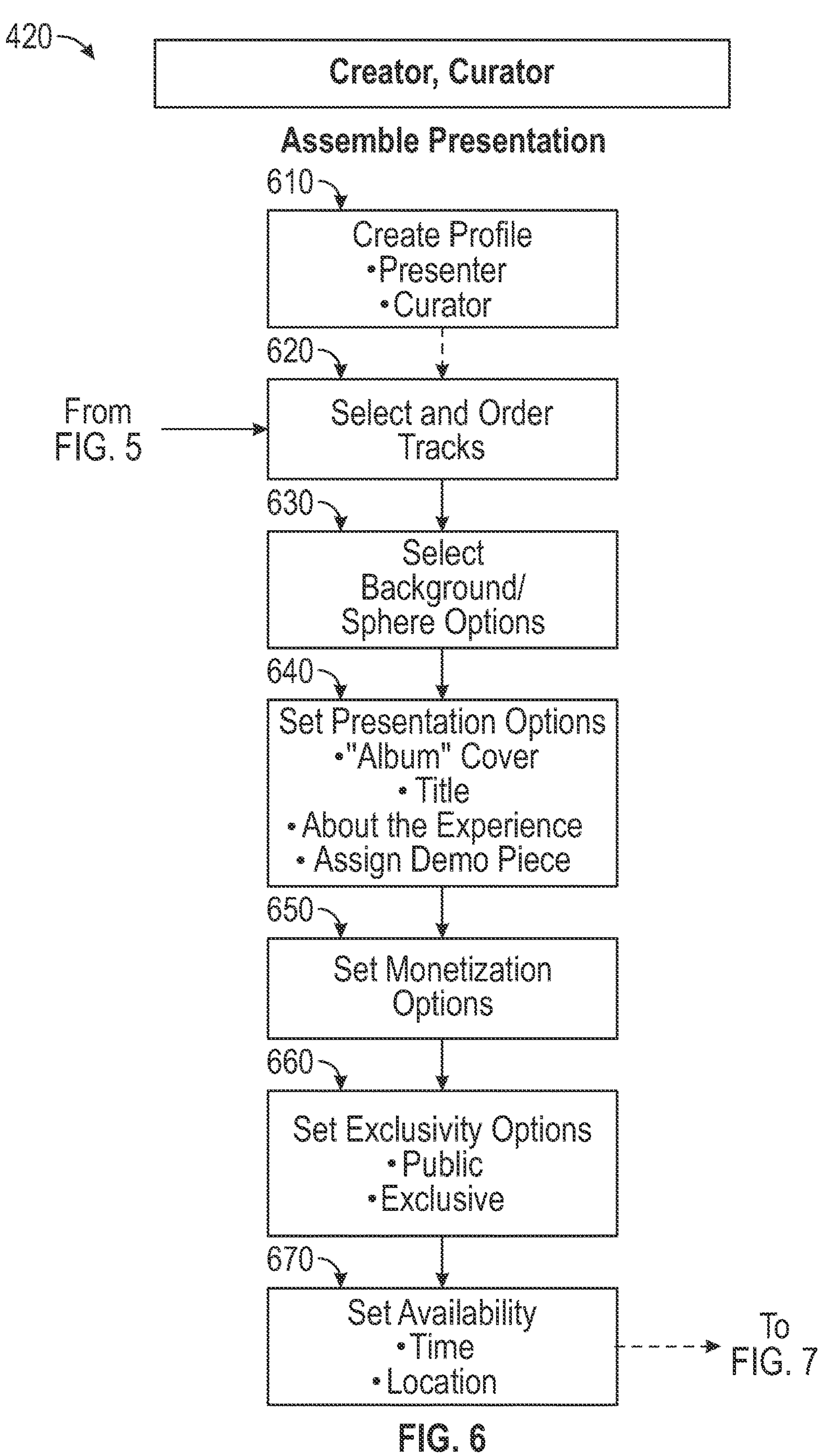
FIG. 6 illustrates the assemble presentation portion of the workflow in FIG. 4.

FIG. 5 illustrates the creator section 410 (corresponding to the "Capture" workflow stage) of the workflow in FIG. 4. As one non-limiting embodiment, a performance may be captured by a prosumer (such as, a professional artist) or a consumer (such as, an amateur or starting artist). The prosumer and consumer can begin their capture process by watching a tutorial 510, 520. Next, they gather the equipment to be used 512, 522. For the consumer, this may be any mobile device with a camera and a tripod while a prosumer may use a green screen, external cameras/mics and other devices. The performance is recorded 514, 524. The prosumer may then synch and combine the video and audio assets 516. The video can then be edited 518, 528.

In order to capture the environment, the user may watch a tutorial 530, gather their equipment 532 and capture the images of the environment 534 (in some embodiments, audio of the environment may also be collected). The images, such as a 360° visual can then be edited 536.

To upload the assets, a user may first create a profile 540. Then, they can select a file and enter metadata, such a date information, 542. In some embodiments, the system may confirm rights and permissions 544 and may also notify a presenter (or curator) for review 546 (e.g., to approve use of their environment). The user may then upload the file 548. Once uploaded, the file may be reviewed and approved 550. If there are any issues, the file may be placed in a rights quarantine 552.

Figure 8:
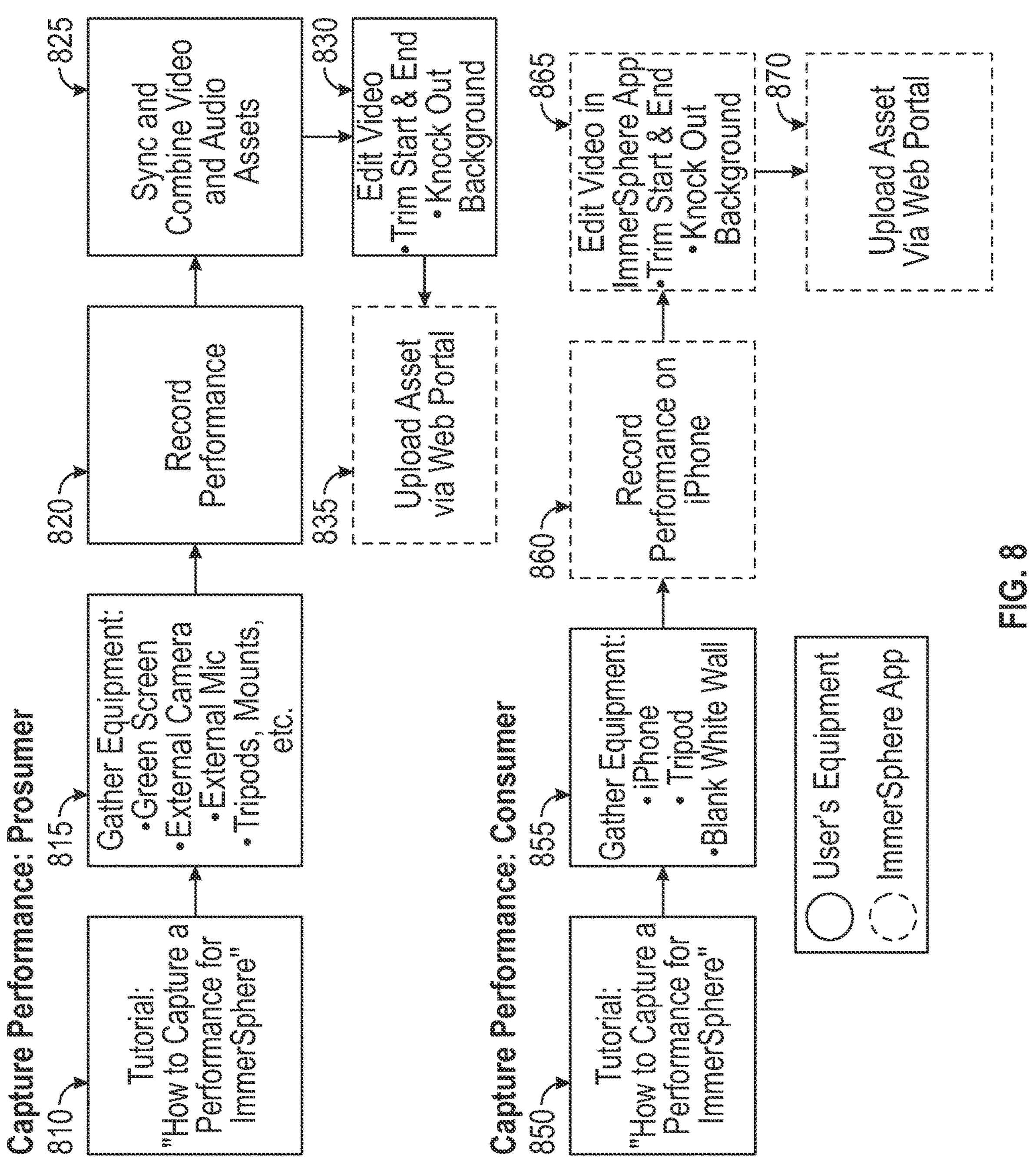
FIG. 8 demonstrates the distinction between prosumer and consumer.

FIG. 8 demonstrates the distinction between prosumer and consumer. Similarly to as shown in FIG. 5, the prosumer and consumer share many similarities. They both can watch tutorials 810, 850; gather equipment 815, 855; record performances 820, 860; edit videos 830, 865 and upload their assets 835, 870.

However, a prosumer may use more complicated devices than a consumer. Some examples of such devices as shown in Table 2. Additionally, the prosumer may have access to technology to assist them in performing the various actions on their own, for example, programs to help synch and combine video and audio assets 825 as well as editing software.

Prosumer and Consumer examples

| | PROSUMER | CONSUMER |
|---|---|---|
| CAMERA | External camera | mobile device with a camera |
| MICROPHONE | External microphone(s) | mobile device with a microphone |
| BACKDROP | Full green screen | Blank white wall |

For the method of capture for performance videos, the artists (or users) can record their foundational videos as closely microphoned as possible, so the sound of their foundational files are close to a black box theater or other extremely small room with very little reverb.

For the method of 360-degree photo or video capture, the user has the opportunity to record the ambient sound of the place as part of their video capture, or to upload an associated audio clip of ambient sound as part of their photo capture. Users can record a 3-to-5-minute ambient sound clip, then choose a 1-to-3-minute segment to loop while the 360 is displayed.

FIG. 6 illustrates the creator/curator section 420 of the workflow in FIG. 4 (corresponding to the "Deliver" workflow stage). In some embodiments, curators (or presenters) may first create a profile which allows them to access various assets and services. Once the assets are uploaded and approved (see FIG. 5), a presenter may select and order tracks 620. They can also select background (or 360-degree environment) options 630. The presentation may also have other options associated with it that can be set, such as, presentation information options 640, monetization options 650, exclusivity options 660 and availability options 670 (e.g., time and location limitations).

For delivery of the combined ambient sounds of place and intentional sounds of performance, various embodiments offer the user dials to adjust the overlaying of environmental sound to performance sound and the ratios of the sound inputs to one another, so that the user can control the sound texture of the resulting experience.

Figure 7:
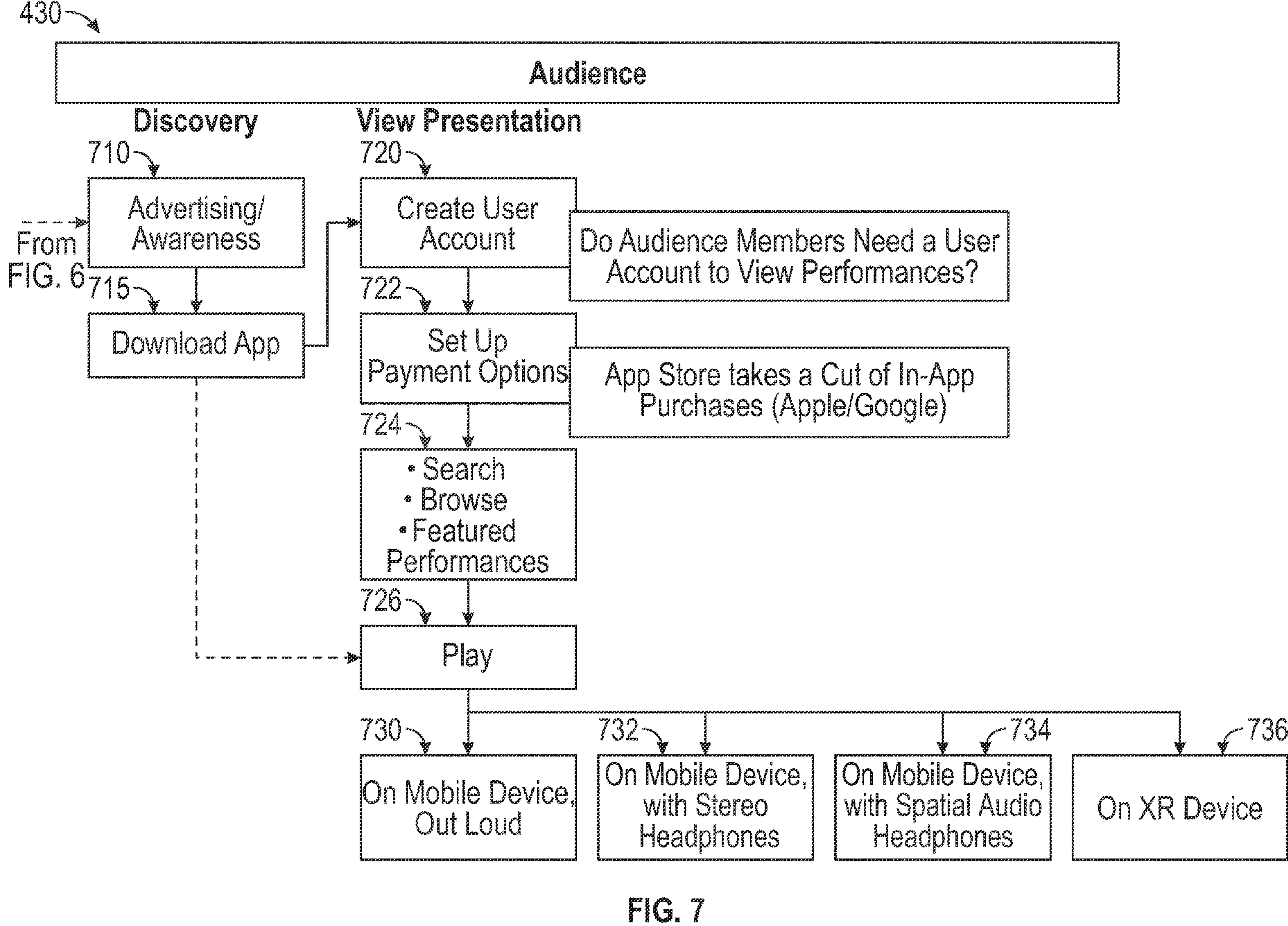
FIG. 7 illustrates the discover and view and post-performance interaction portions of the workflow in FIG. 4.
Figure 7:
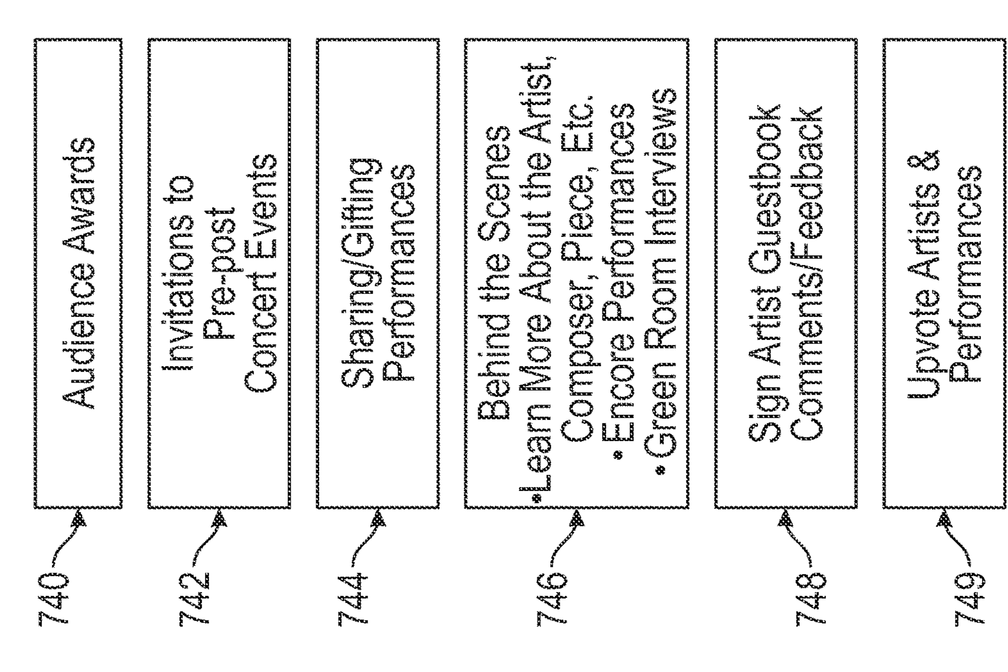
Figure 7:

FIG. 7 illustrates the first and second audience sections 430, 440 of the workflow in FIG. 4 (corresponding to the "Render" workflow stage). After the performance has been assembled and various options set (see FIG. 6), it can be advertised and an audience made aware of the performance 710. The audience may then download an app 715 in order to experience the presentation. Users may also create accounts 720, set up payment options 722, perform searches 724 (e.g., to discover new performances) and to play the performance 726.

As non-limiting examples, the performance may be presented in multiple ways: on a mobile device out loud 730, on a mobile device using stereo headphone 732, on a. 18. mobile device using spatial audio headphone 734, and/or on an extended reality (XR) device 736.

Once the performance has been experienced, the audience may provide feedback in the second audience sections 440. The audience may give awards 740 or upvote artists and performances 749. They may also receive invitations to post-concert events (and/or invitations to pre-concert events for performances in the future) 742. Audience members may also be alerted to behind-the-scenes information (such as encore performances, interviews, etc.) 746 Views may also share or gift performances 744. Users may also elect to sign an artists guestbook and provide comments or feedback 748.

The user workflow is designed to enable user to collect the building blocks of any experience, which the user can then arrange into a delivery format using a template.

The hardware used to render the combinations of performer, space and real world environment can vary. A combination of screens, speakers and cameras, working in concert make it possible to render the above experiences for a user. Output devices can include augmented reality (AR) glasses with headphones or speakers; virtual reality (VR) glasses with headphones or speakers; and mobile devices with headphones or speakers. Other devices may be used, such as headphones (including those configured to operate with head-tracking); a mobile phone, laptop, desktop, edge, projected on a TV, in a cave system/projection map environment, AR, VR, MR/XR/AR/VR, holographic screens; and other rendering systems that could take advantage of a green screened character.

As described above, various embodiments provide a method, apparatus and computer program(s) to classification of spaces and the generation of sound filters for those spaces.

Figure 9:
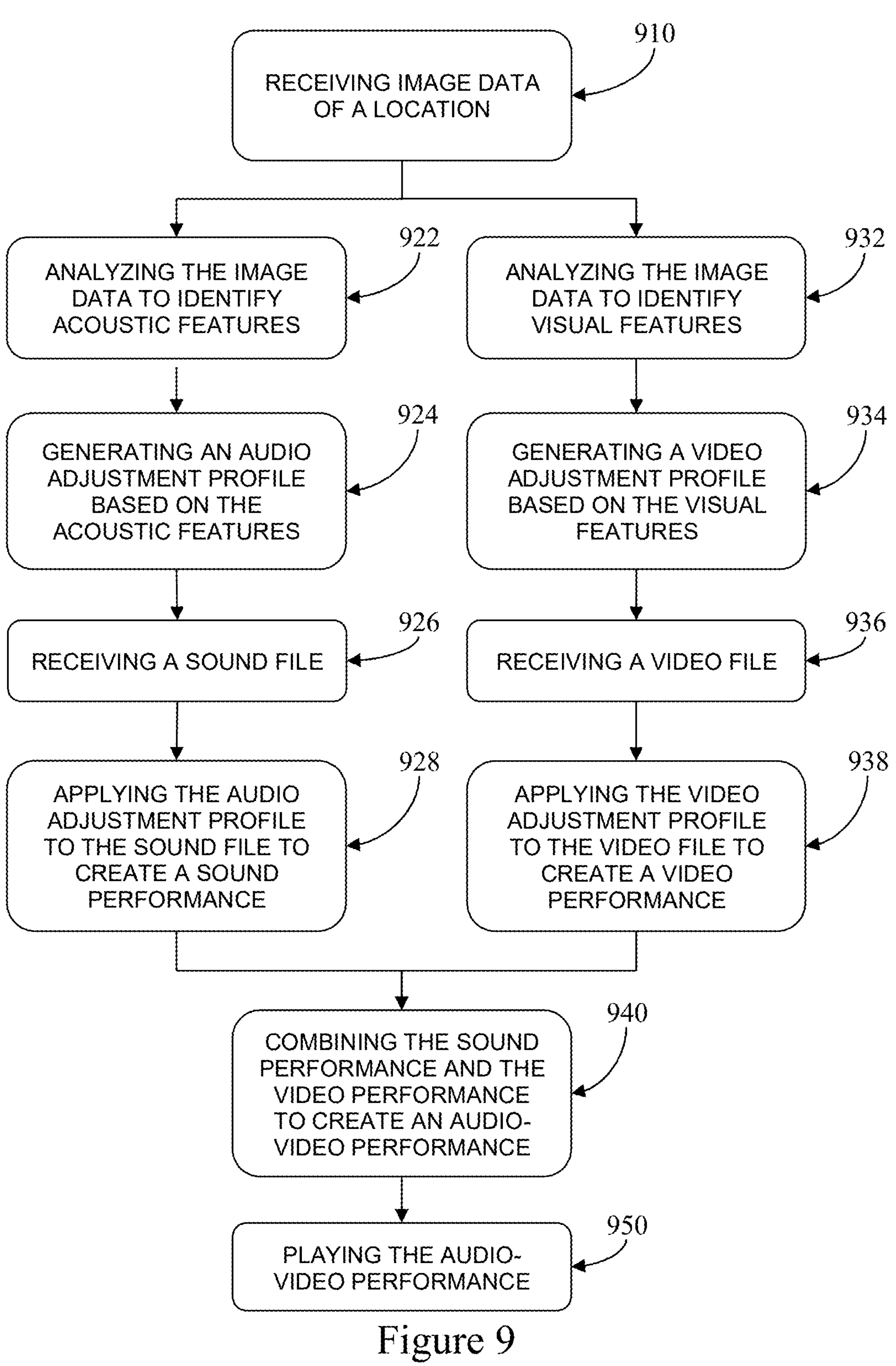
FIG. 9 is a logic flow diagram illustrating a method, and a result of execution of computer program instructions embodied on a memory, in accordance with an embodiment.

FIG. 9 is a logic flow diagram that illustrates a method, and a result of execution of computer program instructions, in accordance with various embodiments. In accordance with an embodiment a method performs, at Block 910, a step of receiving image data of a location, such as a 360° image. The method then analyzes the image data to identify acoustic features, in Block 922, and analyzing the image data to identify visual features, in Block 932. In Block 924, an audio adjustment profile is generated based on the acoustic features and, in Block 934, a video adjustment profile is generated based on the visual features. The method also includes, at Block 926, receiving a sound file, such as audio of a performer playing a piece of music, and, at Block 936, receiving a video file, such as video of a performer playing the piece of music. At Block 928, the audio adjustment profile is applied to the sound file to create a sound performance. The audio from the sound performance is adjusted to sound as though performed at the location shown in the 360° image. At Block 938, the video adjustment profile is applied to the video file to create a video performance so that video from the video performance appears as though performed at the location shown in the 360° image. The audio steps 922, 924, 926, 928 and video steps 932, 934, 936, 938 can be performed together, in parallel or at different times The sound performance and the video performance are combined to create an audio-video performance at Block 940. At Block 950, the method includes playing the audio-video performance.

The various blocks shown in FIG. 9 may be viewed as method steps, as operations that result from use of computer program code, and/or as one or more logic circuit elements constructed to carry out the associated function(s).

Figure 10:
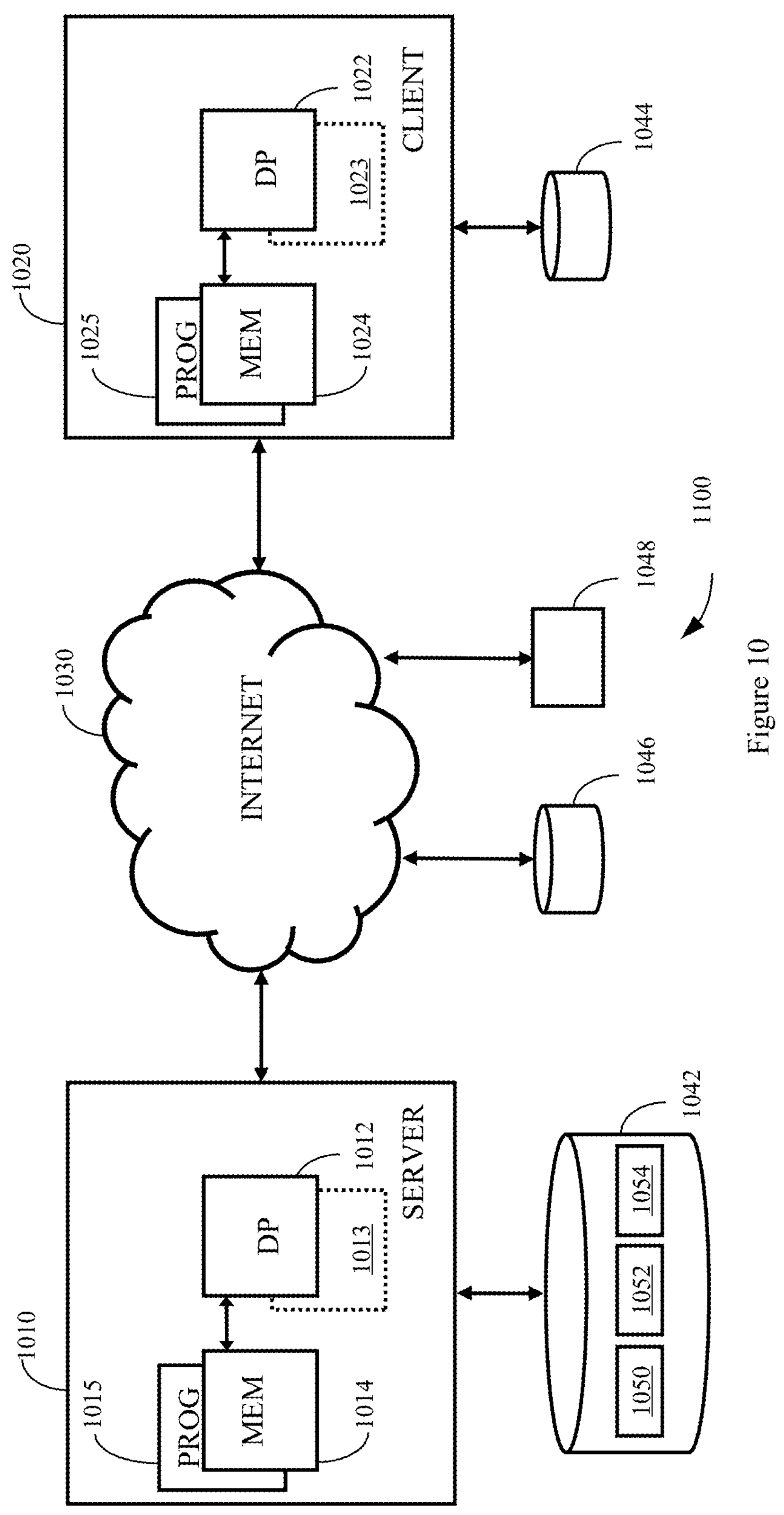
FIG. 10 shows a simplified block diagram of a network-based system that is suitable for practicing various embodiments.

FIG. 10 shows a block diagram of a network-based system 1000 that is suitable for use in practicing various embodiments. In the system 1000 of FIG. 10, the server 1010 includes a controller, such as a data processor (DP) 1012 and a computer-readable medium embodied as a memory (MEM) 1014 that stores computer instructions, such as a program (PROG) 1015. Server 1010 may communicate with a client 1020, for example, via the internet 1030.

Client 1020 includes a controller, such as a data processor (DP) 1022 and a computer-readable medium embodied as a memory (MEM) 1024 that stores computer instructions, such as a program (PROG) 1025. Server 1010 and/or client 1020 may also include a dedicated processor, for example a video processor 1013, 1023. Both server 1010 and/or client 1020 may communicate with video servers 1048, for example, via the internet 1030 (as shown), and/or via direct communications channels (such as a wireless connection or a physical connection).

Databases 1042, 1044, 1046 may be connected directly to the server 1010, the client 1044 or the internet 1030. As shown, database 1042 stores performance videos 1050, location image data 1052 and acoustic adjustment profiles 1054 (which may be associated to specific location image data using metadata); however, this information may be stored separately (or together) in any of the databases 1042, 1044, 1046.

The programs 1015, 1025 may include program instructions that, when executed by the DP 1012, 1022, enable the server 1010 and/or client 1020 to operate in accordance with an embodiment. That is, various embodiments may be carried out at least in part by computer software executable by the DP 1012 of the server 1010, the DP 1022 of the client 1020, by hardware, or by a combination of software and hardware.

In general, various embodiments of the server 1010 and/or client 1020 may include tablets and computers, as well as other devices that incorporate combinations of such functions.

The MEM 1014, 1024 and databases 1042, 1044, 1046 may be of any type suitable to the local technical environment and may be implemented using any suitable data storage technology, such as magnetic memory devices, semiconductor based memory devices, flash memory, optical memory devices, fixed memory and removable memory. The DP 1012, 1022 may be of any type suitable to the local technical environment, and may include general purpose computers, special purpose computers, microprocessors and multicore processors, as non-limiting examples.

Figure 11:
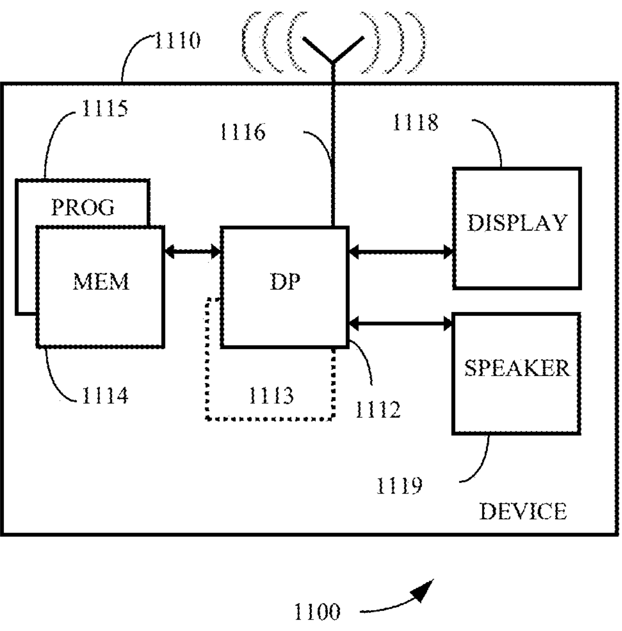
FIG. 11 shows a block diagram of a user device that is suitable for use in practicing various embodiments.

FIG. 11 shows a block diagram of a user device that is suitable for use in practicing various embodiments. In the system 1100 of FIG. 11, the device 1110 includes a controller, such as a data processor (DP) 1112, a computer-readable medium embodied as a memory (MEM) 1114 that stores computer instructions, such as a program (PROG) 1115, and a suitable communication interface, such as a radio frequency (RF) antenna 1116. Device 1110 also includes a display 1118 and speaker 1119. A dedicated processor, for example video processor 1113 may also be included. The display 1118 and speaker 1119 may be incorporated into the device 1110, such as a monitor and sound system, or connected to the device 1110, such as, a VR rig.

The program 1115 may include program instructions that, when executed by the DP 1112, enable the device 1110 to operate in accordance with an embodiment. That is, various embodiments may be carried out at least in part by computer software executable by the DP 1112 of the device 1110, by hardware, or by a combination of software and hardware.

In general, various embodiments of the device 1110 may include, cellular telephones, tablets, computers, digital cameras, gaming devices, music players, as well as other devices that incorporate combinations of such functions.

The MEM 1114 may be of any type suitable to the local technical environment and may be implemented using any suitable data storage technology, such as magnetic memory devices, semiconductor based memory devices, flash memory, optical memory devices, fixed memory and removable memory. The DP 1112 may be of any type suitable to the local technical environment, and may include general purpose computers, special purpose computers, microprocessors and multicore processors, as non-limiting examples. The communication interface (e.g., RF antenna 1116) may be of any type suitable to the local technical environment and may be implemented using any suitable communication technology such as RF systems, including the use of near field communication systems, optical communication systems, such as infrared systems and/or optical scanning systems, induction communication systems, or a combination of such components. Additionally, the communication interface may be a bidirectional interface using transmitters, receivers, and/or transceivers, or, as appropriate for the embodiment, a unidirectional interface.

Figure 12:
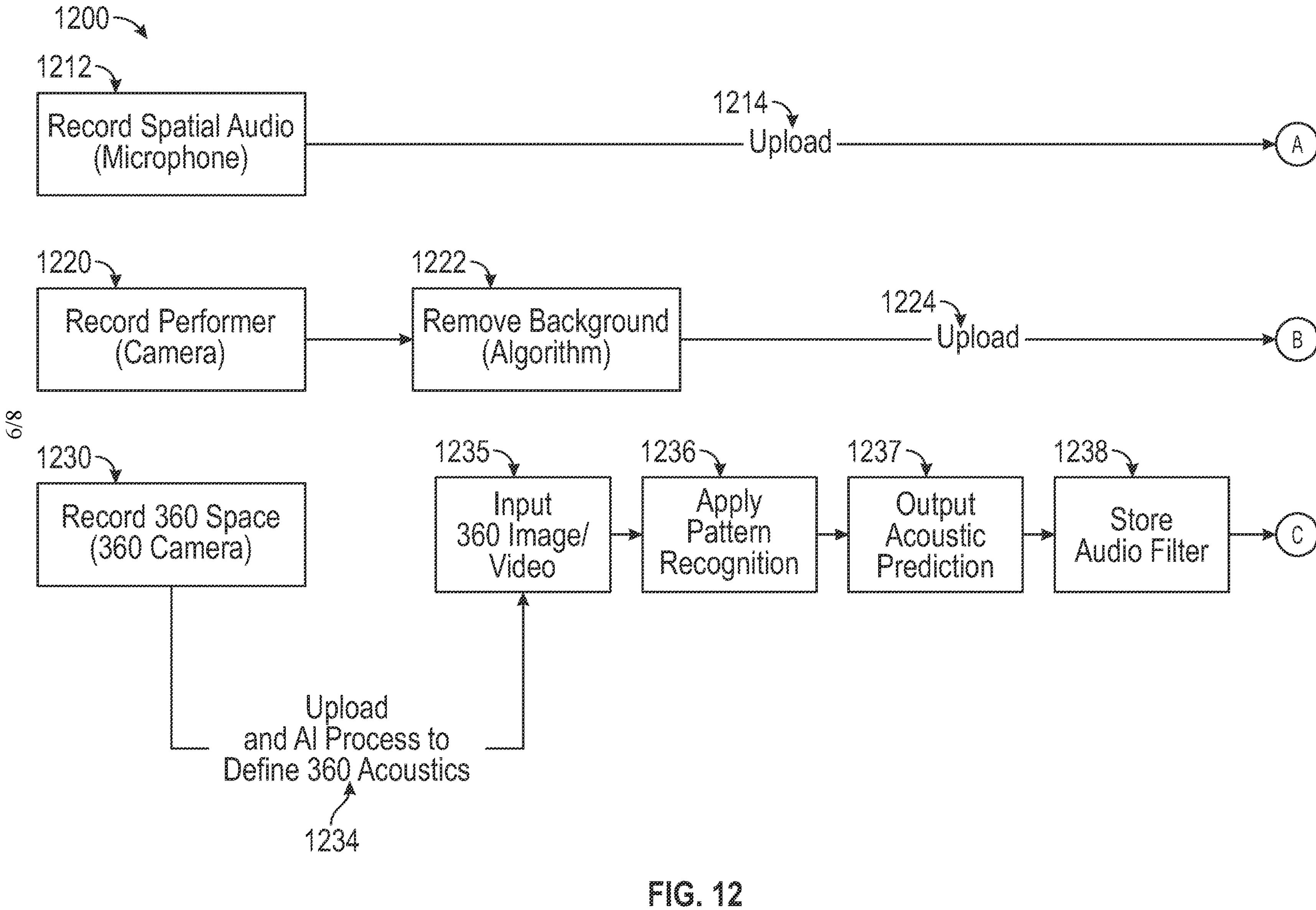
FIG. 12 illustrates a process flow diagram indicating the hardware used in accordance with an embodiment.
Figure 12:
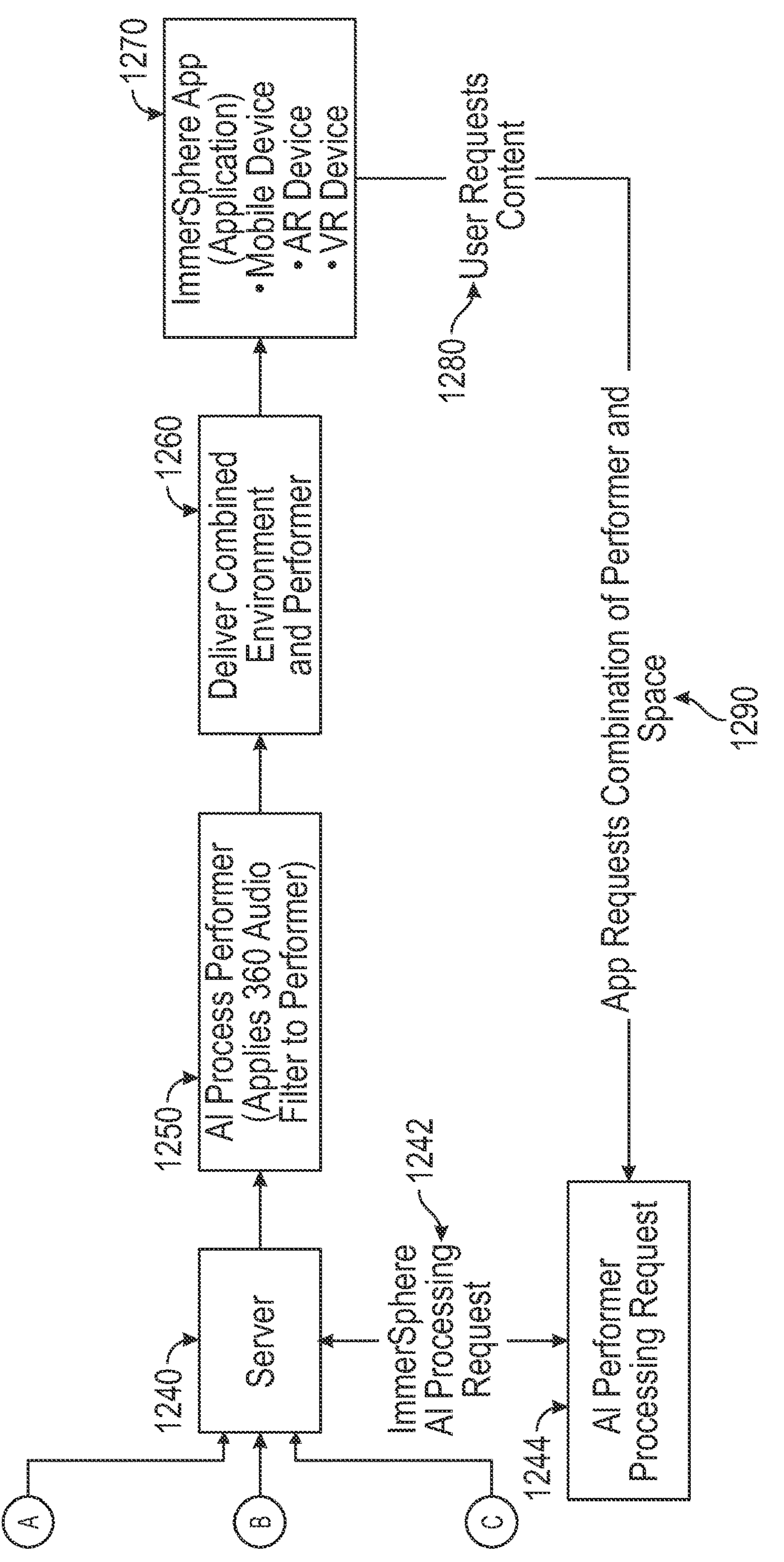

FIG. 12 illustrates a process flow diagram 1200 indicating the hardware used in accordance with an embodiment.

Creators can record spatial audio using a microphone 1212 and upload 1214 the spatial audio to a server 1240; and/or record performers using a camera 1220, remove the background from the performance 1222 (such as with a computer algorithm) and upload the resulting performance to the server 1240. Some users may record a 360° space using a 360° camera 1230, process the 360° recording to define 360° acoustics 1234. This includes using the 360° image/video as input 1235, applying pattern recognition to the 360° image 1236, outputting an acoustic prediction 1237 and storing an audio filter 1238 on the server 1240.

Once the various assets are on the server 1240, the performances are processed 1250, such as, by applying the audio filter. The filtered performance can then be combined with the environment (e.g., the 360° image) and delivered to a user 1260. An app on the user's device, in one, non-limiting embodiment called the ImmerSphere App) can be used to receive the performance. The app 1270 can also be used request content 1280 which can include a request to combine a performance and space 1290. These requests are processed by the system 1244. Additionally, the system can handle application processing requests 1242.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method, comprising:

receiving visual data depicting a physical environment of a location, without receiving audio captured from the location;

analyzing, using a trained computer-based system, the visual data to identify environmental structural features of the location that correspond to acoustic reflection and absorption behavior of the physical environment;

generating, based on the identified environmental structural features, a simulated acoustic response profile of the location that includes at least one of reverberation decay time, reflection delay, or impulse response characteristics of the location; and applying the simulated acoustic response profile to an audio file that is not recorded at the location, such that playback of the audio file is modified to audibly simulate performance within the physical environment of the location.

2. The method of claim 1, wherein generating the simulated acoustic response profile of the location includes reverberation decay time, reflection delay, and impulse response characteristics of the location.

3. The method of claim 1, further comprising:

analyzing the visual data to identify visual features; and generating a video adjustment profile based on the visual features.

4. The method of claim 3, further comprising:

receiving a video file;

applying the video adjustment profile to the video file to create a video performance, wherein video from the video performance is adjusted to appear as though performed at the location; and playing the video performance.

5. The method of claim 1, wherein analyzing the visual data comprises determining values for at least one of the following location description tags:

inside/outsideness, vastness, reflectiveness, and absorbness.

6. The method of claim 1, wherein analyzing the visual data comprises determining values for at least one of the following sound adjustment filters: warbliness, tonal distortion, delay, echoic overlay, and reverb.

7. The method of claim 1, wherein analyzing the visual data comprises determining at least one characteristic for the location.

8. The method of claim 7, wherein the at least one characteristic comprises one of:

indoors, outdoors, underwater and outer space.

9. The method of claim 1, wherein the visual data is a 360-degree visual file.

10. A method for using a trained network to generate an audio performance in a volume of space based on visual data, the method comprising the steps of:

training, by a computer, a network based on input data and a selected training algorithm to generate a trained network, wherein the input data comprises audio data and visual data of events occurring in a plurality of spaces;

acquiring visual data depicting a physical environment for of the volume of space;

analyzing, using the trained network, the visual data to identify environmental structural features of the volume of space that correspond to acoustic reflection and absorption behavior of the physical environment;

generating, based on the identified environmental structural features, a simulated acoustic response profile of the volume of space that includes at least one of reverberation decay time, reflection delay, or impulse response characteristics of the volume of space; and applying the simulated acoustic response profile to an audio file that is not recorded at the volume of space, such that playback of the audio file is modified to audibly simulate performance within the physical environment of the volume of space.

11. The method of claim 10, wherein the step of analyzing the visual data comprises determining values for at least one of the following location description tags: inside/outsideness, vastness, reflectiveness, and absorbness.

12. The method of claim 10, wherein the step of analyzing the visual data comprises determining values for at least one of the following sound adjustment filters: warbliness, tonal distortion, delay, echoic overlay, and reverb.

13. The method of claim 10, wherein the visual data is one of a 360-degree visual file and a two-dimensional visual file.

14. The method of claim 10, wherein analyzing the visual data includes determining at least one characteristic of the volume of space, the at least one characteristic comprising comprises one of:

indoors, outdoors, underwater and outer space.

15. A system for providing a virtual experience of a performance in a volume of space, the system comprising:

a processing unit comprising a network trained on historical visual data of a plurality of volumes of space, each of the plurality of volumes of space having features that affect acoustic properties of each of the plurality of volumes of space, wherein the trained network is configured to:

receive visual data depicting a physical environment for the volume of space, without receiving audio captured from the volume of space;

extrapolate from the visual data, using the trained network, environmental structural features of the volume of space that correspond to acoustic reflection and absorption behavior of the physical environment;

generate, based on the extrapolated environmental structural features, a simulated acoustic response profile of the volume of space that includes at least one of reverberation decay time, reflection delay, or impulse response characteristics of the volume of space; and apply the simulated acoustic response profile to a file comprising audio data such that playback of audio from the file is modified to audibly simulate performance within the physical environment of the volume of space.

16. The system of claim 15, wherein the trained neural network is configured to analyze the visual data and determine values for at least one of the following location description tags: inside/outsideness, vastness, reflectiveness, and absorbness.

17. The method of claim 15, wherein the trained network is configured to analyze the visual data and determine values for at least one of the following sound adjustment filters: warbliness, tonal distortion, delay, echoic overlay, and reverb.

18. The method of claim 15, wherein the visual data is one of a 360-degree visual file and a two-dimensional visual file.

19. The method of claim 15, wherein the at least one of the extrapolated features of the volume of space comprises one of:

indoors, outdoors, underwater and outer space.

* * * * *